3,586,651
PROCESS FOR CLOSED-CELL RIGID POLYURETHANE FOAMS
Ival O. Salyer, Dayton, and Robert T. Jefferson, West Carrollton, Ohio, assignors to the United States of America as represented by the United States Atomic Energy Commission
No Drawing. Filed Mar. 28, 1968, Ser. No. 716,988
Int. Cl. C08g 22/46
U.S. Cl. 260—2.5    4 Claims

ABSTRACT OF THE DISCLOSURE

Closed-cell rigid polyurethane foams are prepared from polyether polyols and polisocyanates using, as a pneumatogen, a cyclopentane-acetone mixture.

---

The invention described herein was made in the course of, or under, Contract W-7405–ENG–48 with the United States Atomic Energy Commission.

BACKGROUND OF THE INVENTION

This invention pertains to porous or cellular synthetic resinous materials and more particularly to improvements in the manufacture of polyurethane foams of closed-cell rigid structure.

Rigid polyurethane foams are well-established commercial products with production reported in millions of pounds per year in the United States (see Ferrigno, "Rigid Plastic Foams," Reinhold 1963; Saunders and Frisch, "Polyurethanes, Chemistry and Technology I Chemistry," High Polymers, vol. XVI, Part I, Interscience, (1962). They are useful for thermal insulation, acoustical absorbers, packing materials, floats, structural fillers, etc. The production of foams from polyether polyols and organic polyisocyanates in the presence of a blowing agent has been previously disclosed, e.g. by E. F. Cox in U.S. Pat. 3,214,397, Oct. 26, 1965. The use of water or halocarbons as blowing agents is well known, although they have certain disadvantages. Water produces a foam by formation of carbon dioxide from the isocyanate and thereby removes an equivalent amount of isocyanate from the resin-forming reaction. This is wasteful of an expensive component. In addition, water is generally not useful for foams having low densities, i.e. less than 4 lb./cu. ft., because of the lack of uniformity as well as other poor physical properties of the foams. Furthermore, the halocarbons are relatively expensive.

SUMMARY OF THE INVENTION

It has now been found that excellent polyurethane foams may be produced by using as blowing agents certain combinations of volatile organic liquids. Specifically, we have found that cyclopentane-acetone mixtures ranging in composition from 85:15 parts by volume of cyclopentane:acetone to 60:40 parts are useful as blowing agents or pneumatogens. For the preparation of low density foams these mixtures are less expensive than previous blowing agents.

Although volatile organic liquids have been considered as blowing agents in the past (E. Klesper, Rubber Age, Oct. 1958, pp. 84–87), single compounds such as acetone or pentane were not found satisfactory. Acetone (B.P. 56° C.) has too high a boiling point and is too soluble in the finished polymer, whereas pentane gives coarse uneven cell structure. Furthermore, we have found that cyclopentane alone cannot be used because of its immiscibility with the prepolymer or liquid resin.

In the present invention, the employment of mixtures of cyclopentane-acetone has given satisfactory foams which could not be obtained by using the individual liquids. It is presumed that this result is related not only to the solvent power of the mixture but also to its azeotropic properties. Cyclopentane and acetone form an azeotrope (B.P. 41.0° C.) at 36% by weight acetone or approximately 65:35 parts by volume of cyclopentane: acetone. All of the cyclopentane-acetone mixtures of the present invention boil below 45° C. For effective blowing, the boiling point of the pneumatogen should generally not be above 50° C.

The cyclopentane-acetone mixtures impart further benefits in that they reduce the exotherm which accompanies the foaming process and which, uncontrolled, may cause scorching or charring of the product. These mixtures have high heats of vaporization, in excess of 7000 calories/ mole, which are higher than those of the previously used halocarbons. They therefore serve as heat sinks for dissipating the exothermic energy of the condensation reaction, moderating the temperature and eliminating scorch.

Further advantages attributable to the present improved process are that the reactants are readily pumped in commercial foaming machines because of their reduced viscosity in the presence of cyclopentane-acetone mixtures. Such reduced viscosities permit more accurate pumping and closer adherence to the desired stoichiometry, thereby resulting in high-quality foams.

The foams produced by this process are rigid, substantially closed cell-foams. Because of their structure they are useful for thermal insulation, for structural packing, for floats, and for other applications where a closed-cell uniform strength foam is desired.

According to the present invention there is provided an improvement in the process of making a rigid substantially closed-cell polyether-type polyurethane foam by the reaction of an aromatic polyisocyanate with a polyether polyol together with simultaneous foaming by action of a blowing agent, the improvement in which the blowing agent comprises a mixture of cyclopentane and acetone having a volume ratio for cyclopentane:acetone of between 85:15 and 60:40.

It is an object of the present invention to provide rigid polyurethane foams of controlled density less than 4 lb. per cubic foot. It is a further object to provide substantially closed-cell rigid low-density polyurethane foams having uniform pore size.

Suitable aromatic polyisocyanates include tolylene 2,4- and tolylene 2,6-diisocyanates, m- and p-phenylene diisocyanates, chlorophenylene 2,4-diisocyanate, naphthalene 1,5-diisocyanate, diphenyl 4,4'-diisocyanate, and diphenyl ether diisocyanate. Mixtures of aromatic diisocyanates may be used.

Suitable polyether polyols include the hydroxyl-terminated reaction products of cyclic oxides, e.g., 1,2-alkylene oxides, with polyhydric compounds such as those described by A. W. Anderson in U.S. Pat. 2,927,918 (to Dow Chemical Company), Mar. 8, 1960. The reaction products of propylene oxide and glycerine, sorbitol, sucrose or pentaerythritol are particularly useful. Mixtures may be used if desired.

The cyclopentane-acetone mixtures are provided in a wide range of compositions boiling below 45° C., but the preferred compositions are those containing 70–85 parts of cyclopentane by volume per 30–15 parts of acetone by volume. They are generally used at a level of 6–9% by weight of the foam-forming mixture.

If desired there may be included in the polyurethane foam-forming reaction mixture a catalyst, for example, a tertiary amine such as triethylamine or 1,4-diazabicyclo (2,2,2) octane, a tin compound such as diacetoxydibutyltin or tin (II) octoate, or mixtures thereof.

There may also be included various additives, not herein claimed, such as surfactants, foam-stabilizing agents, dyes, pigments, fillers, plasticizers, flame-retardants, etc.

The relative quantities of diisocyanate and polyether polyol may be varied, but it is preferred that the stoichiometry be such that there is a slight excess of diisocyanate, as for example where the NCO/OH index is 1.02.

DESCRIPTION OF THE PREFERRED EMBODIMENTS

The invention is further illustrated by, but not limited to, the following examples.

Example 1

This example illustrates the use of a 60:40 (by volume) mixture of cyclopentane-acetone as a pneumatogen.

There was first prepared a quasi-polymer, component A, by reaction of a diisocyanate and a relatively small amount of polyol. To 144.2 grams of commercial tolylene diisocyanate consisting of a mixture of 2,4- and 2,6-isomers in a weight ratio of approximately 80:20, respectively (hereinafter designated as TD–80), there was added about 0.04 ml. of diacetoxydibutyltin as a catalyst and 31.6 grams of the branched polyether polyol prepared by the addition of propylene oxide to glycerol and having a molecular weight of 255 and a hydroxyl number of 660 hereinafter designated as CP–260. The reaction mixture was maintained below 50° C., approximately 45–50° C., until the reaction was complete. The viscosity of the freshly prepared prepolymer was 500 cps. at 25° C.

Component B containing the bulk of the polyether polyol was prepared from 60.0 grams of the propylene oxide adduct of sorbitol having a molecular weight of 700 and a hydroxyl number of 490, hereinafter designated as LS–490; 58.5 grams of CP–260; 4.5 grams of a foam stabilizer (e.g. "Selcon R–150" obtainable from Houdry Process and Chemical Company and described in their bulletin of May 1, 1964 as a low viscosity, all-organic polymeric compound having a specific gravity of 1.07 at 20/4° C. and a viscosity of 1700 cps. at 25° C.); and 13.5 grams of pneumatogen consisting of a 60:40 (by volume) mixture of cyclopentane-acetone.

The components were mixed, using 174 grams of A, 137 grams of B, and 13.5 grams of additional cyclopentane-acetone pneumatogen in a high-speed impeller-type mixer (e.g. "Waring Blendor") and was immediately discharged into a cardboard box. The foam rise time was 10.4 min.; the exotherm was 85° C. The foam was cured at 75° C. overnight. The finished foam had a density of 1.9 lb./cu. ft. and a compressive strength of 22.1 lb./sq. in. The foam had uniform pore size.

Example 2

This example illustrates the use of a 60:40 (by volume) cyclopentane-acetone mixture as a pneumatogen for a polyurethane formulation based on tolylene diisocyanate and diphenylmethane diisocyanate.

Component A was prepared as follow: to 8000 grams of TD–80 and about 0.75 ml. of diacetoxydibutyltin was added 2255 grams of CP–260 slowly with continual stirring, maintaining the temperature at 45–50° C. Thereafter was added 2675 grams of commercial 4,4′-diphenylmethane diisocyanate (e.g. "Multrathane M" obtainable from Mobay Chemical Company and described in their data sheet No. 01070A of Feb. 1, 1959 as essentially pure di-functional isocyanate (99% minimum p,p′-diphenylmethane diisocyanate)) previously melted and filtered. The prepolymer was cooled and mixed with 1035 grams of pneumatogen consisting of a 60:40 (by volume) mixture of cyclopentane-acetone.

Component B was prepared from 6666 grams of LS–490, 2110 grams of CP–260, 334 grams of R–150 and 890 grams of pneumatogen.

The components were mixed in a Mobay M–31 foam machine having two Bosch multiple piston, injection-type metering pumps and a mixer. The pumps were set to deliver 1215 grams/min. of component A and 846 grams/min. of component B. The foam rise time was 10 min. and the exotherm was 95° C. The foam was cured at 75° C. overnight. The finished foam had a density of 2.4 lb./cu. ft. and a compressive strength of 26.8 lb./sq. in. A foam measuring 52 in. x 52 in. x 12 in. was cured at 60° C. and was free of cracks or blowholes. The foam had a uniform pore size.

Example 3

This example illustrates the use of a 70:30 (by volume) mixture of cyclopentane-acetone as a pneumatogen.

Component A was prepared as follows: to 420 grams of TD–80 and 0.09 gram of diacetoxydibutyltin was slowly added 105 grams of CP–260, stirring continually and keeping the temperature at 45–50° C.

Component B was prepared by mixing together 410 grams of LS–490, 46.8 grams of CP–260, 17.5 grams of R–150 and 5.9 grams of pneumatogen consisting of a 70:30 (by volume) mixture of cyclopentane-acetone.

A mixture of component A, component B and 75 grams of additional pneumatogen was made in a high-speed impeller-type mixer and poured quickly into a cardboard box. The foam rise time was 15 min.; the exotherm was 115° C. The foam was cured at 75° C. overnight. The finished foam had a density of 2.15 lb./cu. ft. and compressive strength of 20.0 lb./sq. in. The foam had uniform pore size.

Example 4

This example illustrates the use of an 80:20 (by volume) cyclopentane-acetone mixture as a pneumatogen.

Component A was prepared as follows: to 100 grams of TD–80 and 0.03 gram of diacetoxydibutyltin was added 29.4 grams of CP–260 with continual stirring while maintaining the temperature below 65° C. Thereafter was added 67.0 grams of commercial 4,4′-diphenylmethane diisocyanate which had been melted and filtered. The viscosity was 710 cps. at 25° C.

Component B was prepared by mixing together 90 grams of LS–490, 31.5 grams of CP–260, 4.5 grams of R–150, and 22.5 grams of pneumatogen consisting of an 80:20 (by volume) mixture of cyclopentane-acetone.

A mixture of 186 grams of component A and 148.5 grams of component B was made and poured quickly into a cardboard box. The foam rise time was 8.8 min.; the exotherm was 88° C. The foam was cured at 75° C. overnight. The density of the finished foam was 2.4 lb./cu. ft. and the compressive strength was 32.8 lb./sq. in. The foam had uniform pore size.

It is to be understood that although the invention has been described with specific reference to particular embodiments thereof, it is not to be so limited since changes and alterations therein may be made which are within the full intended scope of this invention as defined by the appended claims.

What we claim is:
1. In the process of making a rigid substantially closed-cell polyether-type polyurethane foam by the reaction of an aromatic polyisocyanate with a polyether polyol together with simultaneous foaming by action of a blowing agent, the improvement in which the blowing agent comprises a mixture of cyclopentane and acetone having a volume ratio for cyclopentane:acetone of between 85:15 and 60:40.

2. The process of claim 1 in which the aromatic polyisocyanate is selected from the group consisting of 2,4-tolylene diisocyanate, 2,6-tolylene diisocyanate, and 4,4'-diphenylmethane diisocyanate.

3. The process of claim 1 in which the polyether polyol is the reaction product of propylene oxide with a member selected from the group consisting of glycerine and sorbitol.

4. The process of claim 1 in which the mixture of cyclopentane and acetone contains 70 parts of cyclopentane to 30 parts of acetone by volume.

References Cited
UNITED STATES PATENTS 3,194,773  7/1965  Hostettler _____ 260—2.5

FOREIGN PATENTS 707,381    4/1965   Canada _____ 260—2.5
860,109    12/1952  Germany _____ 260—2.5
1,075,964  4/1954   France _____ 260—2.5

OTHER REFERENCES

Saunders et al.: Polyurethanes, Part II, p. 286 (1964).
Encyclopedia of Polymer Science and Technology, pp. 532–534 (1966).

DONALD E. CZAJA, Primary Examiner

E. C. RZUCIDLO, Assistant Examiner

U.S. Cl. X.R.

161—190